Figure 3:
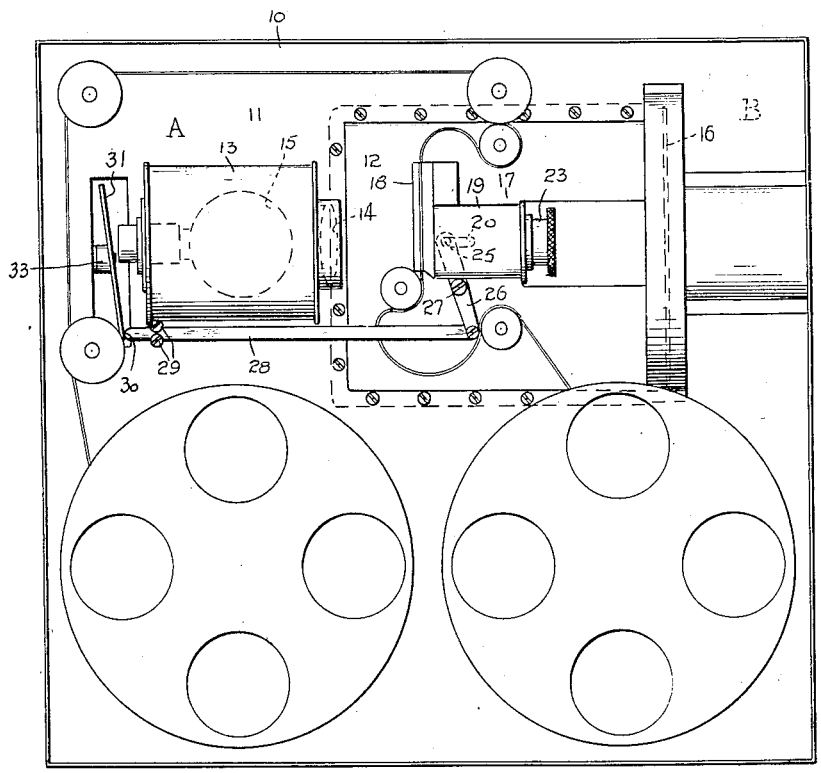

March 15, 1927.
H. W. JOY
1,620,768
FOCUSING DEVICE FOR MOTION PICTURE PROJECTING APPARATUS
Original Filed Feb. 5, 1924   2 Sheets-Sheet 1
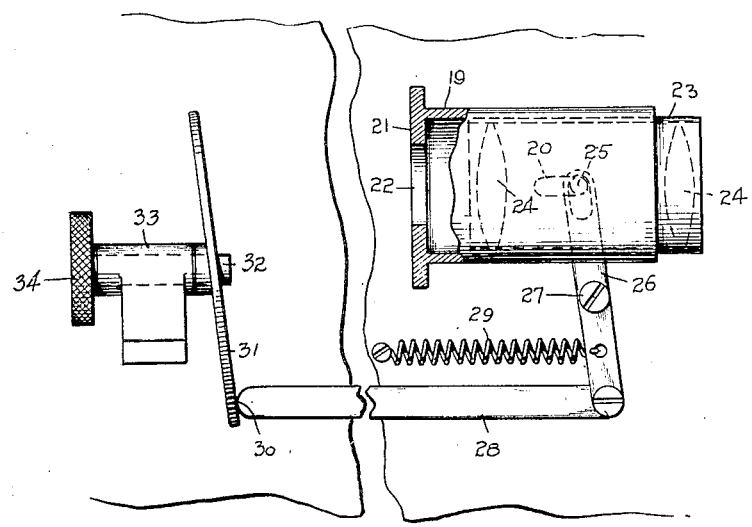
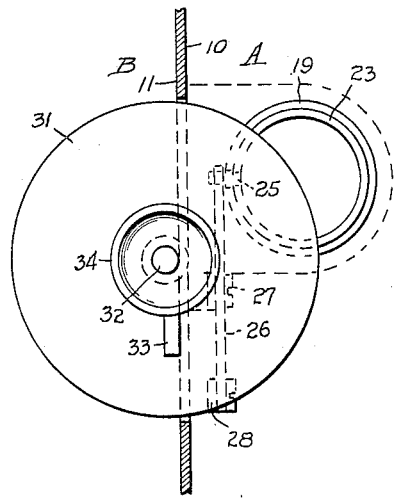
Henry W Joy
Inventor
By his Attorney March 15, 1927.  H. W. JOY  1,620,768

FOCUSING DEVICE FOR MOTION PICTURE PROJECTING APPARATUS

Original Filed Feb. 5, 1924    2 Sheets-Sheet 2

Henry W Joy
Inventor

By his Attorney

Patented Mar. 15, 1927.

1,620,768

UNITED STATES PATENT OFFICE.

HENRY W. JOY, OF NEW YORK, N. Y.

FOCUSING DEVICE FOR MOTION-PICTURE-PROJECTING APPARATUS.

Original application filed February 5, 1924, Serial No. 690,706. Divided and this application filed November 12, 1924. Serial No. 749,390.

My invention relates generally to portable motion picture projecting apparatus and has specific reference to certain improvements in the construction and arrangement of a focusing device for the lenses of the projector.

The present invention relates to matter divided out of my application for Letters Patent of the United States filed February 5, 1924, Ser. No. 690,706 resulting in Patent 1,580,204, April 13, 1926.

The object of the invention is to provide a focusing device of the character described which is particularly adaptable for cameras or projectors when the lenses are disposed at a remote point with respect to the position of the operating mechanism for film control, and which is designed to impart, when operated, a smooth substantially microscopic adjustment to the lens cylinders.

The invention is illustratively exemplified in the accompanying drawings, in which Figure 1 is a side elevational view of my improved focusing mechanism; Figure 2 is a front elevational view of the same; and Figure 3 is a side elevation of a motion picture projecting apparatus showing the focusing mechanism applied thereto.

Referring to the drawings, 10 denotes a rectangular housing or casing composed preferably of sheet metal and having a longitudinally disposed full partition plate 11 upon which the focusing mechanism and other moving parts are mounted. The compartment indicated A on one side of the partition 11 contains mechanism for handling the film and the other compartment B is adapted to contain parts of the power transmitting mechanism and the batteries from which the lighting circuit may receive its current.

Mounted on the partition 11 and disposed rearwardly of a plate 12, which supports the film operating mechanism, is a lamp housing 13 having the usual condenser lens 14 at the forward end and a high powered electrically lighted lamp 15 supported on its rear wall.

Attached to the plate 12, centrally thereof, and in coaxial alinement with the axes of the condenser lens 14 and openings in a cut off shutter 16, is a focusing lens 17 which may be mounted in any well known manner, including a framing device 18 to receive and guide the film. According to the present construction of the focusing lens 14, the well known rack and pinion control for adjusting the lens is replaced by a device which overcomes any objectionable features associated with the usual arrangement and enables the focusing to be effected at any convenient location on the machine.

The focusing lens and device 14 comprises an outer cylinder or mount 19 having a longitudinal slot 20 in the side thereof and a closed end wall 21 provided with an opening 22 to admit the light rays after passing through the film. Slidably mounted in the bore of the cylinder 19 is a lens jacket 23, in which the projecting lens members 24 are disposed and which is provided with a pin 25 adapted to project through the slot 20 to receive an operating mechanism, comprising a straight lever 26 pivotally mounted centrally thereof about a pivot screw 27 carried by the plate 13. The upper end of the lever 26 is provided with a longitudinal slot to loosely embrace the outer end of the pin 25, and the lower end is pivotally connected to a laterally arranged slide rod 28 for transmitting movement to the lens jacket 23. The rod 28 in the present instance projects towards the rear of the machine and is guided adjacent the free end between suitable guide screws 29. The rod 28 is normally drawn rearwardly by means of a helical spring 29, one end of which is attached to the lower portion of the lever 26 below the pivot 27, while the opposite end is fixed to the plate 12. The free end of the rod 28 is provided with a round nose portion 30 which is yieldably held in contact with the marginal portion of an oblque disc 31. The disc, revolves about its axis parallel to the rod 28, and is fixed at an angle upon a shaft 32 supported in a bearing 33, said shaft 32 being provided with a knurled thumb nut 34 fixed to the end projecting beyond the bracket.

In operation. it will be clear that rotary movement of the thumb nut 34 will revolve the disc 31 thereby imparting a rectilinear motion to the rod 28, which in turn rocks the lever 26 and causes the lens jacket 23 to longitudinally adjust itself with respect to cylinder 19. With this arrangement the focusing control nut 34 may be disposed in any convenient place in the machine and the movement imparted therefrom to the lens jacket 23 will be a very smooth motion which enables the operator to make both fine and coarse adjustments in a comparatively short space of time. A still further advantage associated with the use of the oblique disc motion resolves into an operation which permits of a complete rotation of the thumb control head 34, consequently avoiding the usual limited movement of "dead cuts" to the turning of the head 34.

What I claim is:—

1. In a motion picture projecting apparatus, a focusing element comprising a lens and an adjustable lens jacket therefor, yieldable means for imparting longitudinal movement to said jacket in one direction, and a control disc disposed obliquely to its axis of rotation and operatively associated with said first means for determining the amount of longitudinal adjustment of said jacket.

2. In a motion picture projecting apparatus, a focusing element comprising a casing provided with a longitudinal slot, a lens jacket arranged in said casing and having a projection in said slot, a pivoted lever having a slot at one end to receive the end of said projection, yieldable means for normally holding the jacket within the casing, a slide rod moving with the other end of said lever, and an oblique disc control associated with the free end of said rod to control the longitudinal position thereof and consequently the position of the lever and lens jacket.

3. An oblique disc control, as claimed in claim 4, including a rotatable shaft, means for supporting and rotating the shaft, and a disc disposed obliquely on said shaft and being arranged in contact with the free end of said rod, substantially as described.

In testimony whereof I affix my signature.

HENRY W. JOY.